(12) United States Patent
Wong et al.

(10) Patent No.: US 9,324,985 B2
(45) Date of Patent: Apr. 26, 2016

(54) BLOCK COPOLYMER BATTERY SEPARATOR

(75) Inventors: David Wong, Hsinchu (TW); Nitash Pervez Balsara, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 105 days.

(21) Appl. No.: 14/006,576

(22) PCT Filed: Mar. 22, 2012

(86) PCT No.: PCT/US2012/030132
§ 371 (c)(1),
(2), (4) Date: Feb. 4, 2014

(87) PCT Pub. No.: WO2012/129411
PCT Pub. Date: Sep. 27, 2012

(65) Prior Publication Data
US 2014/0212766 A1    Jul. 31, 2014

Related U.S. Application Data

(60) Provisional application No. 61/466,414, filed on Mar. 22, 2011.

(51) Int. Cl.
*C08J 3/09* (2006.01)
*H01M 2/16* (2006.01)
*H01M 2/14* (2006.01)

(52) U.S. Cl.
CPC ............ *H01M 2/145* (2013.01); *H01M 2/1653* (2013.01)

(58) Field of Classification Search
CPC ............................ H01M 2/145; H01M 2/1653
USPC .......................................................... 524/113
See application file for complete search history.

(56) References Cited

U.S. PATENT DOCUMENTS

2009/0075176 A1* 3/2009 Singh et al. ................... 429/309

* cited by examiner

*Primary Examiner* — Hui Chin
(74) *Attorney, Agent, or Firm* — Lawrence Berkeley National Laboratory

(57) ABSTRACT

The invention herein described is the use of a block copolymer/homopolymer blend for creating nanoporous materials for transport applications. Specifically, this is demonstrated by using the block copolymer poly(styrene-block-ethylene-block-styrene) (SES) and blending it with homopolymer polystyrene (PS). After blending the polymers, a film is cast, and the film is submerged in tetrahydrofuran, which removes the PS. This creates a nanoporous polymer film, whereby the holes are lined with PS. Control of morphology of the system is achieved by manipulating the amount of PS added and the relative size of the PS added. The porous nature of these films was demonstrated by measuring the ionic conductivity in a traditional battery electrolyte, 1M $LiPF_6$ in EC/DEC (1:1 v/v) using AC impedance spectroscopy and comparing these results to commercially available battery separators.

7 Claims, 6 Drawing Sheets

BLOCK COPOLYMER BATTERY SEPARATOR

CROSS REFERENCE TO RELATED APPLICATIONS

This application claims priority to PCT Application PCT/US2012/030132, filed Mar. 22, 2012, which in turn claims priority to U.S. Provisional Application Ser. No. 61/466,414 filed Mar. 22, 2011, which application is incorporated herein by reference as if fully set forth in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

1. Field of the Invention

This invention relates generally to lithium ion batteries, and more specifically to a polystyrene-block-polyethylene-block-polystyrene copolymer which is blended with a homopolyer to from a film, the homopolymer then removed using an organic solvent to thus create a nonoporous film where the holes lined with the homopolymer, the film useful as a battery separator.

2. Brief Description of the Related Art

Nanoporous separators used in lithium ion technology are of considerable current interest in spite of the fact that they are an inactive component of the battery. In most cases, the separators are composed of inert semi-crystalline polyolefins such as polyethylene and polypropylene. A liquid electrolyte contained in the pores is responsible for ion transport in the battery. Although these polyolefin materials only cost about 1.30 $/kg, the cost of a typical battery separator is in the vicinity of 120-240 $/kg[1]. This large increase in price is mainly due to the complex and carefully controlled processing steps used to generate the porous structure within the separator.

One of the most widely used processes presently used in the manufacture of battery separators is the "wet process" wherein a membrane comprising a phase separated mixture of an amorphous and a semi-crystalline polyolefin is immersed in a solvent and holes are created by dissolving out the amorphous polyolefin[2]. Semi-crystalline polyolefins such as polyethylene are only soluble in solvents at elevated temperatures in the vicinity of the melting point of the crystals, which is in the vicinity of 120° C. for polyethylene. Thus the dissolution step can readily be conducted at a convenient temperature (e.g. room temperature).

Uniformity of the resulting pore structure is crucial for advanced lithium battery performance as non-uniformity of the pores will lead to non-uniform current distribution during battery operation. Defects in the separator can lead to catastrophic failure of batteries. Most polyolefins are immiscible in each other[3-7]. The extent of phase separation in the membrane prior to the pore formation step is determined entirely by non-equilibrium effects. Small changes in the processing conditions can lead to large changes in the phase separated morphology which, in turn, affects pore structure. Since driving forces for phase separation in polymers depends crucially on the molecular weight of the components [Flory and Huggins], small changes in the molecular weight distributions of the amorphous and semi-crystalline components can also result in alterations of the pore structure.

The wet process for the production of battery separators produces separators that are quite different from separators made from the dry process: specifically, the holes produced by the wet method are only minimally orientated[2]. Typically, in the wet method, polyolefin resins are mixed with paraffin oils and other additives, extruded into films, and washed with a volatile solvent to remove the paraffin oils[2, 8, 9]. The holes are produced by the extraction of the oil, and the films are stretched either before or after extraction to increase porosity, resulting in minimally oriented pore structures[8]. In contrast, the holes produced in the dry process are made entirely from stretching the films, which leads to uniaxially oriented films[2]. The uniaxially oriented films produced from the dry method only have a high tensile strength in one direction, whereas the films produced using the wet method typically have high tensile strength in all directions. The balance of tensile strength in not necessarily advantageous as tensile strength is primarily important for roll processing of polymer films, in which the polymers are only pulled along one axis[8]. The tortuosity of separators made from dry processes is also significantly lower than the tortuosity of separators produced using wet processes: separators produced from the dry process have straight, open pore structures suitable for high power density applications, while separators produced the wet process have more porous, tortuous structures more suitable for long battery life applications[2].

SUMMARY OF THE INVENTION

By way of this invention a new wet process for creating nanoporous battery separators is described. This membrane is composed of a polystyrene-block-polyethylene-block-polystyrene (SES) copolymer. The self assembly of block copolymers into ordered structures on the 10 nm length scale is well-established[10-12]. A membrane is created by first casting a mixture of polystyrene (PS) homopolymer and the SES copolymer and then dissolving the PS (which is amorphous) in a manner that is very similar of the wet process described above. This creates a membrane with nanoscale pores in a polyethylene matrix.

There are two crucial differences between the present process and the conventional wet process. First, the phase separated morphology that is the basis for the porous structure of the final membrane is at equilibrium and thus does not require strict control during the film formation step. Second, the pores are naturally lined with PS chains because of the structure of the SES copolymer. Since PS is more polar than PE, it may lead to more complete filling of the porous structure with the electrolyte. Pores that are lined with more polar chains such as polyethylene oxide (PEO) can readily be made by using a mixture of a polyethylene oxide-block-polyethylene-block-polyethylene oxide copolymer and PEO instead of the present SES/PS mixture. While it is tempting to focus on the properties of the SES copolymer as key to the functioning of the separator, we have found that it is the molecular weight of the sacrificial amorphous PS component that is key for obtaining membranes with a well-connected pore structure.

The approach described herein for creating nanoporous films has been used by others for a wide range of applications ranging from water filtration to drug delivery[13-15]. Yang et al.[15] spin coated thins film blends of homopolymer poly (methyl methacrylate) (PMMA) and poly(styrene-block-methyl methacrylate) (PS-b-PMMA) onto an energetically neutral surface. The PMMA homopolymer was washed out using a selective solvent leaving an ordered set of cylindrical holes with a diameter of 15 nm. The diameter of the holes was controlled and reduced to as small as 6 nm by deposition of Au onto the surface. The authors showed that these mesoporous thin films could be utilized for single-file diffusion, resulting in slow, linear release of drugs, which can be contrasted to Fickian diffusion-limited release in membranes with larger holes. Uehara et al. [13] created mesoporous structures using poly(styrene-block-ethylene) (PS-b-PE) by etching out amorphous PS domains using fuming nitric acid. By varying the length of exposure, the diameter of the holes was varied from 5 to 30 nm. The diffusion of glucose and the retention of albumin in these membranes could be controlled based on the pore size. To Applicants' knowledge, however, this application comprises the first systematic study of the effect of the characteristics of the sacrificial component on transport through the nanoporous film.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
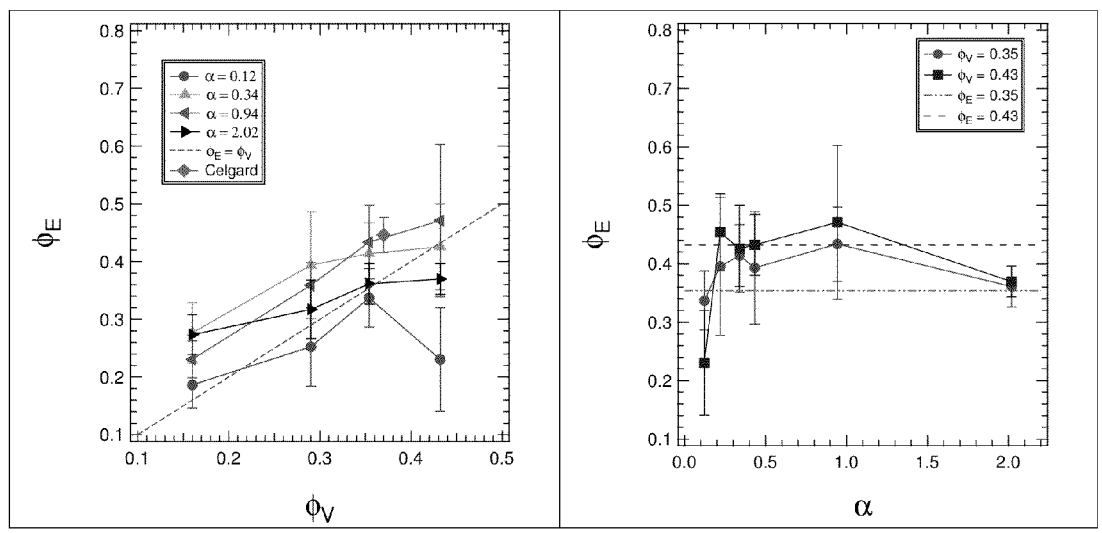
FIG. 1 is a plot of $\phi_E$ as a function of a) $\phi_v$ for select values of a; and b) a for a $\phi_v$ of 0.35 and 0.43.

SES (polystyrene-block-polyethylene-block-polystyrene) copolymers were synthesized using a combination of anionic synthesis and a subsequent saturation reaction. Polystyrene-block-poly-(1,4)-butadiene (SB) was synthesized using sec-butyl lithium as an anionic initiator in cyclohexane and then coupled using dibromoethane to produce symmetric SBS[16]. The nonpolar solvent cyclohexane enables the polybutadiene to grow at approximately 93% of the 1,4-addition. SBS was saturated using the diimide p-toluenesulfonyl hydrazide in the presence of equimolar tri-n-propyl amine to prevent protonation of unsaturated polymers[17]. Homopolymer polystyrenes (PS) were also synthesized anionically using sec-butyl lithium as the initiator. The SES copolymer synthesized for this paper is has molecular weights of 15-82-15 kg/mol and a ethylene volume fraction, $\phi_{PE,BCP}$, of 0.77. Six different PS homopolymers were synthesized with molecular weights ranging from 1.8 kg/mol to 30 kg/mol.

The PS molecular weight was measured using a Viscotek GPC Max VE-2001 equipped with a TDA 302 triple-detector system calibrated using PS standards with tetrahydrofuran (THF) as the eluent. For the PS block of the SBS copolymers, an aliquot of PS was taken out of the reaction vessel during synthesis prior to butadiene addition. The volume fractions of each block of the SBS copolymer and the relative vinyl additions were determined using $^1$H nuclear magnetic resonance (NMR) spectroscopy. In addition, the complete saturation of the vinyl groups in the butadiene block was verified using $^1$H NMR as well.

To remove saturation reagents from the SES copolymer, the polymer was precipitated in methanol, redissolved in o-xylene at 100° C., washed using deionized water, then redissolved and precipitated twice more before being dried at 80° C. in vacuum for 2 days. To remove reaction salts from PS homopolymers, PS homopolymers were precipitated in methanol and redissolved in benzene twice before being filtered through a 0.2 μm filter and freeze-dried in a lyophilizer (Millrock LD85).

Films of SES/PS blends were prepared using a custom built solvent caster with a doctor blade to determine control film thickness. Blends of SES and PS were dissolved in o-xylene (1:10 w/v) at 120° C. These solutions were then cast onto aluminum foil maintained at 80° C. After drying for 15 minutes at 80° C., the films were placed in vacuum overnight to dry. The aluminum foil was then separated from the polymer film using 1M hydrochloric acid. Polymer films were dried and weighed before the PS homopolymer was selectively removed by washing the film in THF. In all cases, the change in mass of the film after washing and drying agreed with the amount of homopolymer PS extracted (+/−2%). A nominal void fraction was computed for each film, $\phi_v$, defined as the fraction of volume occupied by the PS homopolymer in the SES/PS mixture, prior to dissolution. $\phi_v$ is calculated from the composition of the films polymers and densities of PE, PS, and SES as 0.78, 0.97, and 0.83 g/cm$^3$, respectively, as calculated from monomer volumes[18]. The nanoporous films used in this study are thus characterized by two parameters: $\phi_v$, the nominal void fraction in the film, and $\alpha$, the normalized chain length of the sacrificial homopolymer before dissolution.

Conductivity experiments were performed using Swagelok cells with polished electrodes having a diameter of 22.2 mm. Impedance spectroscopy measurements were made using a potentiostat (Bio-Logic VMP3). Polymer samples were cut out using a 22.2 mm diameter punch, weighed, and then placed into a standard lithium battery electrolyte solution of 1M LiPF$_6$ in Ethylene Carbonate/Diethyl Carbonate (1:1 v/v, Novolyte Technologies) for at least 2 days. After swelling for 2 days, the swollen films were placed in the Swagelok cells and the impedance was measured. The impedance spectroscopy measurements were taken between a frequency range of 1 MHz to 500 mHz at a peak-to-peak amplitude voltage of 10 mV. Conductivities were calculated as σ=1/Ar$_b$, where A is the Swagelok electrode area, 1 is the sample thickness, and R$_b$ is the bulk resistance as determined from the intersection of the real impedance axis on the Nyquist impedance plot. For samples with higher resistance, the sample resistance was taken as the low frequency minimum on a Nyquist impedance plot. The thickness of the samples was measured using a micrometer after the impedance spectroscopy measurements were complete. Electrolyte uptake measurements were made by blotting the films and weighing them after conductivity and film thickness measurements. The volume fraction of electrolyte in the film, $\phi_E$, was calculated from the known weights of the dry film and the electrolyte uptake, using the densities of the polymer and the electrolye ($_{Nee}$=1.26 g/cm$^3$), ignoring the possibility of non-ideal mixing between SES and the electrolyte.

$$\varphi_E \text{ is } \frac{(m_{swollen} - m_{dry})/\rho_{elec}}{(m_{dry}/\rho_{poly})/(1-\phi_V)},$$

where $m_{dry}$ and $m_{swollen}$ are the dry and swollen weights of the film.

Nitrogen physisorption experiments were performed using a Micromeritics TriStar II. Polymer samples were cut into strips and dried under vacuum for 4 hours. The Brunauer Emmett Teller (BET) method was employed to calculate an internal surface area for the films[19]. The specific surface area, $a_s$(BET) can be calculated using $$a_s(BET) = \frac{n_m^a L a_m}{m}, \quad (1)$$

where L is Avogadro's number, $a_m$ is the area of a monolayer, which is 0.162 nm$^2$ for N$_2$, m is the mass of the absorbent, and $n_a{}^m$ is the monolayer capacity. The monolayer capacity can be calculated by fitting data to the BET equation in linear form, $$\frac{p}{n^a(p^o - p)} = \frac{1}{n_m^a C} + \frac{C-1}{n_m^a C} \frac{p}{p^o}, \quad (2)$$

where p is the equilibrium pressure, p$^o$ is the saturation pressure, C is a fitting parameter related exponentially to the enthalpy of adsorption, and n$^a$ is the volume of nitrogen adsorbed at a relative pressure p/p$^o$. The BET equation is fit for low p/p$^o$ values to determine C and $n_m{}^a$. Further interpretation of physisorption data were based on IUPAC recommendations[20].

Scanning electron microscopy (SEM) images were taken using a Hitachi S-5000 Scanning Electron Microscope. Films were first cryofractured in liquid nitrogen. Samples were then loaded onto a brass stub using carbon tape and sputter coated with Au/Pd before imaging.

In FIG. 1a the electrolyte volume fraction, $\phi$E, versus void volume fraction, $\phi$v is plotted for films with selected values of α. The dashed line in Figure 1a represents a line through the origin with slope=1. It is evident that regardless of sample composition, $\phi_E \approx \phi_v$. This implies that the nominal pore volume generated by our process is filled with electrolyte, regardless of void fraction and homopolymer chain length. The separator has finite elasticity. For reference, we plot the electrolyte uptake of Celgard 2400 as well. The uptake of Celgard 2400 seems to be in reasonable agreement with the separators we synthesized. Regardless of α, $\phi_E$ increases with increasing $\phi_v$. The only major exception is at α=0.12, α$_v$=0.43, where $\phi_v$ is significantly lower than expected. We plot $\phi_E$ as a function of α in FIG. 1b at fixed void volume fractions of 0.35 and 0.43. We focus on this range of $\phi_v$ because current commercial separators have void volume fractions in this range. There does not seem to be any significant trend with the uptake of electrolyte and α—the amount of void generated, regardless of the sacrificial block seems to remain approximately constant.

Figure 2:
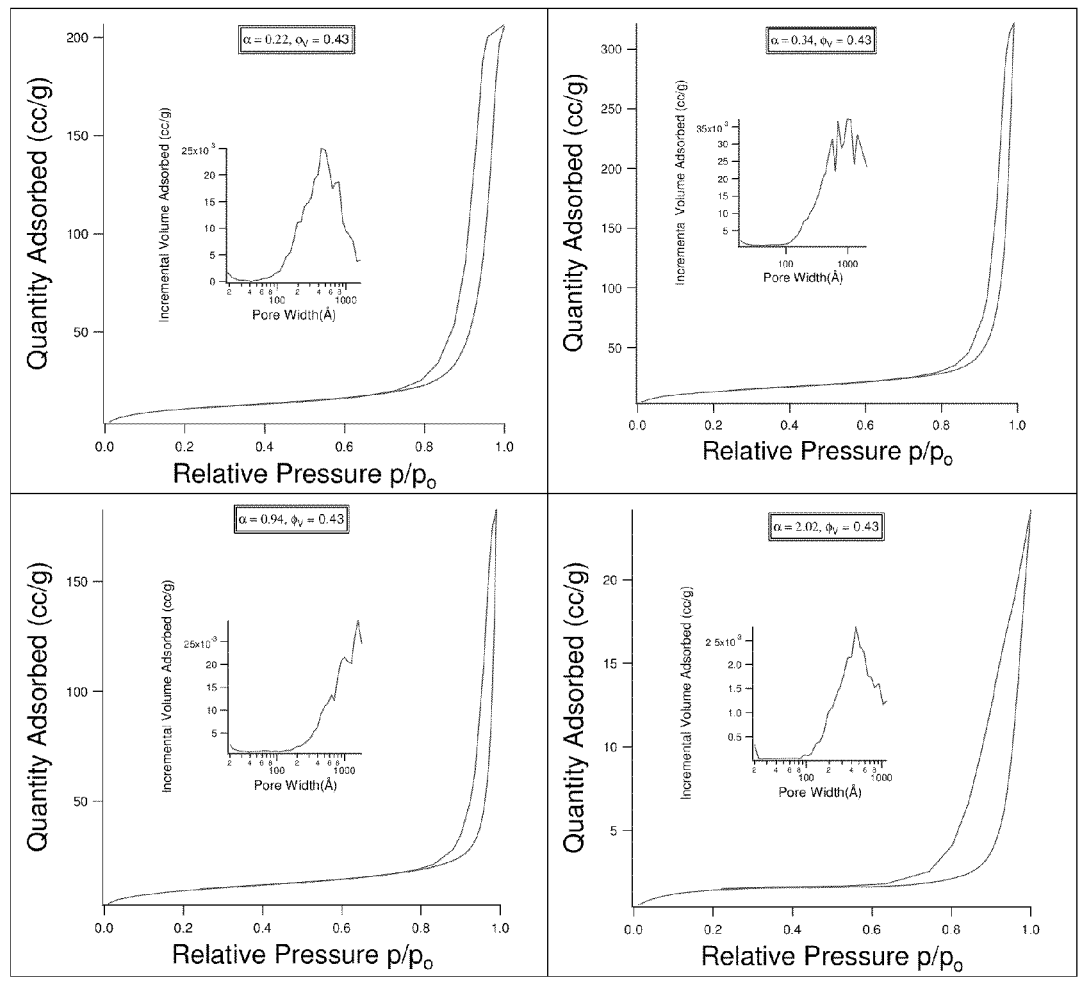
FIG. 2 is a plot of nitrogen adsorption data with quantity adsorbed as a function of relative pressure at $\phi_v$=0.43 for a) $\alpha$=0.22; b) $\alpha$=0.34; c) $\alpha$=0.94; and d) $\alpha$=2.02. Inserts are pore size distributions as calculated by the BJH method.

In FIG. 2 we show typical results of nitrogen physisorption experiments, where the volume of absorbed in the separator is plotted as a function of relative pressure, p/p$_o$, for selected values of a at a fixed $\phi_v$=0.43. In addition, the pore size distributions as calculated using the Barrett-Joyner-Halenda method (BJH) are plotted. Materials with pores on the nanoscale are characterized by curves with plateaus at both high p/p$_o$ values with a hysteresis loop at intermediate p/p$_o$ values. We see this behavior at α=0.22 (FIG. 2a). The plateau at high p/p$_o$ values is almost nonexistent when α is increased to 0.34 (FIG. 2b). When α=0.94, there is still a significant amount of nitrogen adsorbed, however, the high p/p$_o$ peak is quite sharp. At α=2.02, we see no plateau at high p/p$_o$ values, and very low amounts of nitrogen adsorption (FIG. 2d). This indicates the presence of a macroporous structure.

Figure 3:
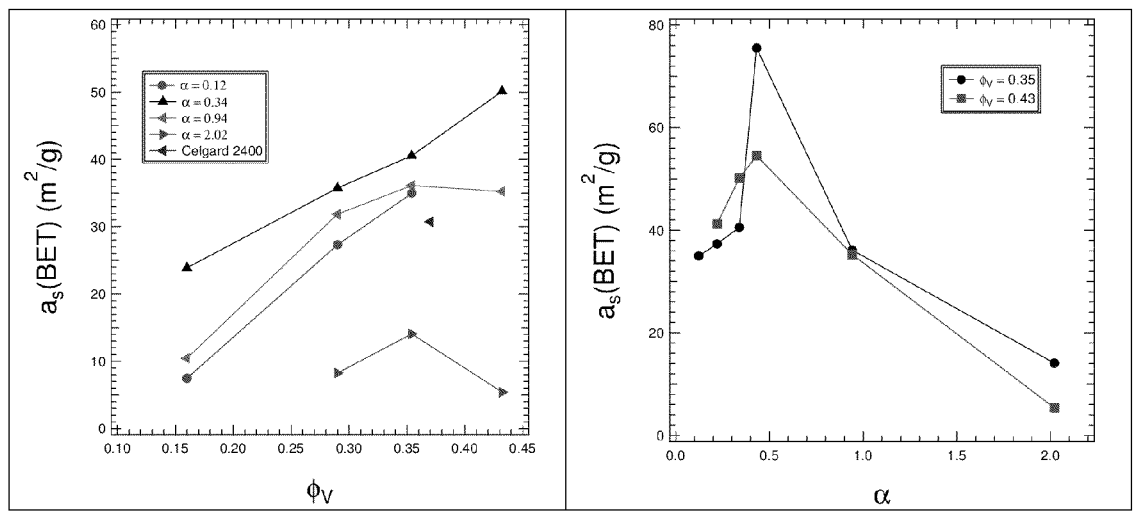
FIG. 3. is a plot of $a_s$ (BET) as a function of a) $\phi_v$ for select values of $\alpha$; and b) a for a $\phi_v$ of 0.35 and 0.43.

In FIG. 3a, the specific surface area in our separators, $a_s$(BET), estimated using the BET equation as mentioned above, is plotted versus $\phi_v$ for films with selected values of α (same sample set shown in FIG. 1a). As expected $a_s$(BET) increases with increasing $\phi_v$, regardless of α. Again, we include Celgard 2400 on this plot—the surface area of Celgard 2400 seems to be reasonable relative to the synthesized separators. In FIG. 3b, we plot $a_s$(BET) versus α at fixed void volume fractions of 0.354 and 0.432 (same sample set shown in FIG. 1b). We find that $a_s$(BET) is peaked in the vicinity of 0.4 for both void fractions. The results in FIGS. 2 and 3 are consistent in that they suggest that films made with intermediate values of α have more accessible pores than those made from either very small values of α (e.g. 0.12) or very large values of α (e.g. 2.03). However, while the size of the sacrificial block did not affect the overall void available for electrolyte to swell, it is clear that it has a dramatic effect on the internal pore structure, with an optimal value of α that occurs in the vicinity of 0.4.

Figure 4:
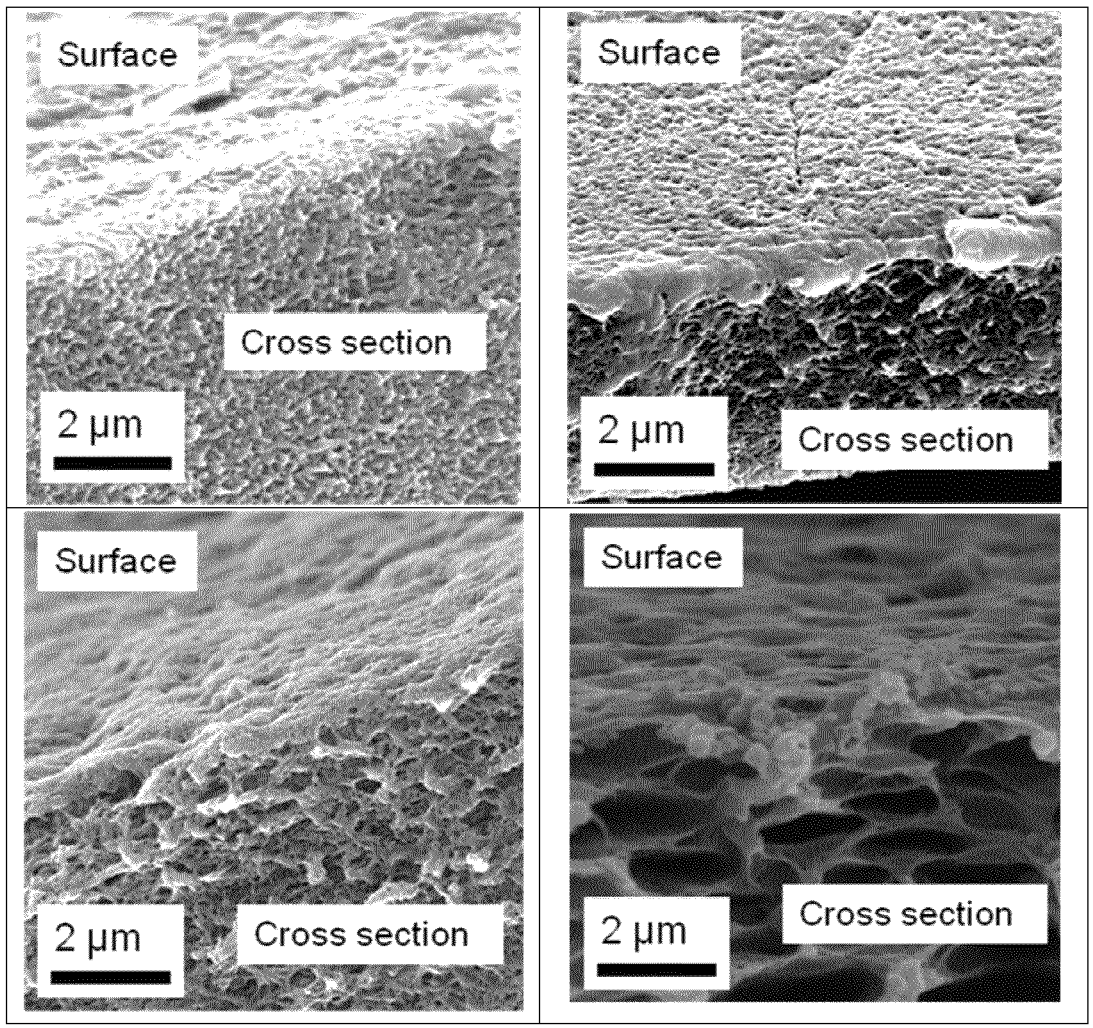
FIG. 4 are scanning electron micrographs of $\phi_v$=0.43 at a) $\alpha$=0.22; b) $\alpha$=0.34; c) $\alpha$=0.43; and d) $\alpha$=2.02 obtained by cryofracturing washed out films.

Position space images of the pore structure in our films were obtained by SEM and the typical results are shown in FIG. 4 where data obtained at a fixed $\phi_v$ of 0.43 are shown. In FIG. 4a, we see a very fine porous structure in the cross section of the film in the SEM image. Larger nanoscale pores can be seen in the film cross-sections at intermediate α values of 0.34 and 0.942 (FIGS. 4b and 4c). FIG. 4d shows an interesting morphology of well-defined pores on the micron length scale for the α=2.03 membrane but no pores on the nanometer length scale are seen in this case. These pores are corroborated by the BET data: the highly porous structure for the α=2.03 membrane seems to have pores exclusively on the macroporous scale.

In FIG. 5a we plot separator conductivity, σ, versus void volume fraction, $\phi_v$, for films with selected values of α (for the same sample set shown in FIGS. 1a and 2a). As expected, σ increases with increasing $\phi_v$ for all values of α. The conductivity of Celgard 2400 was also measured as 0.41 mS/cm, which is in reasonable agreement with literature values for the electrolyte used [21, 22]. The conductivity of our separators was lower than Celgard 2400, but of the same magnitude. In FIG. 5b, we plot σ versus α at fixed $\phi_v$=0.43. At $\phi_v$=0.43, ionic conductivity is peaked at an a value between 0.2 and 0.3, decreasing rapidly when α decreases from this value, and decreasing gradually as α increases toward 2.0. Quite surprisingly, ion transport rates at α=0.11 and 2.0 are similar. In FIG. 5c, we plot σ as a function of α for the other values of $\phi_v$. For these values of $\phi_v$, the σ is relatively constant across all values of α. In FIG. 5d, we average σ at $\phi_v$=0.16, 0.29, and 0.35, and then plot σ at $\phi_v$=0.43 for each α examined. Again, we see that σ peaks at intermediate values (0.2 and 0.3) of α and then decreases for both higher and lower values of α.

It is likely that the observed dependence of the separator properties on α is due to the phase behavior of mixtures and block copolymers and homopolymers, i.e. the morphology of the film before the dissolution step. The morphologies of pure A-B block copolymers depends mainly on the volume fraction of one of the blocks [12, 23, 24] and the nature of blocks (crystalline versus amorphous). Lamellae are obtained in symmetric systems when $\phi_A$, the volume fraction of the A-block, is in the vicinity of 0.5 while bicontinuous gyroid networks and hexagonally packed cylinders are obtained in asymmetric systems. In the case where one of the blocks is semi-crystalline, lamellae are obtained over a wider composition window, and additional complexity arises due to the formation of crystalline lamellae in one of the lamellae. Depending on thermodynamics and kinetics, the crystals can either be trapped within the microdomains or break out of them, as quantified by Register, Ryan, and coworkers [25-32].

The addition of a homopolymer results in changes in the morphology [33-38]. In the simplest case, the homopolymer simply swells the A domain and thus morphologies seen in pure block copolymers are obtained provided $\phi_A$ is now taken to be the total A volume fraction, including both homopolymer and block copolymer. This behavior is anticipated when the chain length of the homopolymer is comparable to but smaller than the length of the A block—small values of $\alpha$. If $\alpha<<1$, then the homopolymer is distributed homogeneously throughout the sample, while if $\alpha>>1$ then the homopolymer forms macroscopically phase separated domains.

The full phase behavior of A/A-B homopolymer/block copolymer mixtures is much more complex than that outlined above as it also depends of the Flory-Huggins interaction parameter, $\chi$, and homopolymer volume fraction, as outlined by Matsen [39, 40] and others [41-43]. In many cases, the behavior of A-B-A triblock copolymers (of the kind studied in this paper) is very similar to that of A-B diblock copolymers obtained by cutting the A-B-A chain in half. It is thus likely that the large body of work on A-B/A mixtures described above is applicable to the present study.

Several groups have studied the phase behavior of A-B-A triblock copolymers with added A or B homopolymers [44-47]. In particular, Mykhaylyk et al. added hPS ($\alpha=0.11$) to a poly(styrene-block-isoprene-block-polystyrene) (SIS) copolymer, and found that at weight fractions about 27% for thin films, the structures would disorder as probed by atomic force microscopy (AFM)[45]. Using the literature value of $\chi$ between polystyrene and polyethylene (0.096 at 298K based), we can compute the product $\chi N$ for the SES copolymer ($\chi N=84$) and the phase windows for the different homopolymers added to create the separators. For instance, based on Matsen's calculations[40], a symmetric ($\phi_A=0.5$) diblock copolymer with a $\chi N=40$ and $\alpha=1.0$, begins to macrophase separate above 20% homopolymer.

Herein we have characterized SES nanoporous separators, without going into a detailed discussion of the phase behavior of SES/PS mixtures. Nevertheless we understand the morphology of these blends depends on several variables. Our initial intuition and the electrolyte uptake data in FIG. 1 might have suggested that the molecular weight of the sacrificial homopolymer is irrelevant. This appears to be true with the exception of the $\alpha=0.12$ and $\phi_v=0.43$ case. In FIG. 5b, we show the ionic conductivity of the resulting membranes soaked electrolyte as a function of the normalized chain length of the homopolymer for a $\phi_v$ of 0.43. Ionic conductivity is peaked at an $\alpha$ value of about 0.3, decreasing rapidly when $\alpha$ decreases from this value, and decreasing gradually as $\alpha$ increases toward 2.0. Quite surprisingly, ion transport rates at c0.12 and 2.0 are similar. At $\alpha=0.12$ and $\phi_v=0.43$, the homopolymer chain length is small and it is miscible in both microphases of the block copolymer. Thus when the homopolymer is extracted, it creates molecular voids that do not allow for much solvent to be imbibed (as seen in FIG. 1a).

Figure 5:
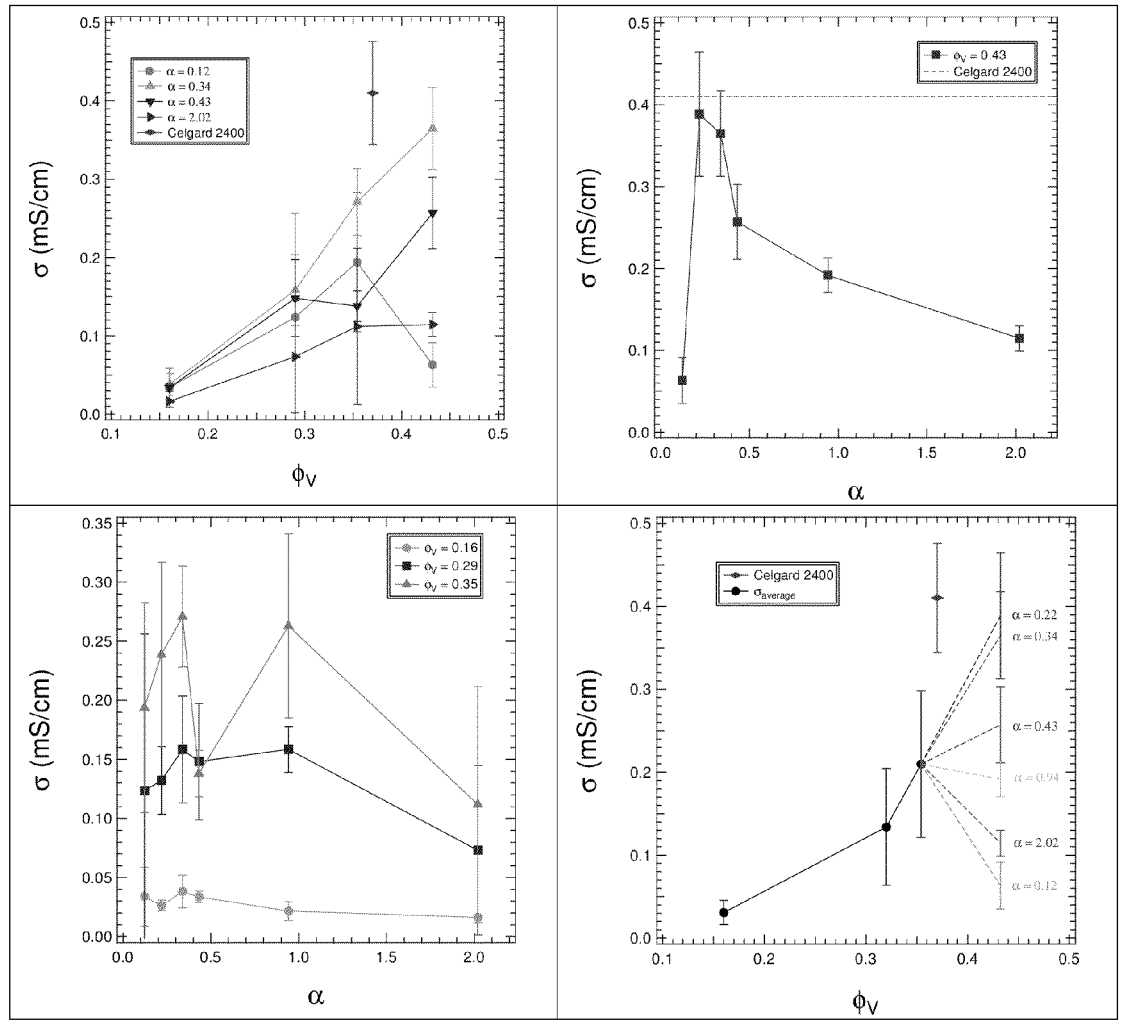
FIG. 5 is a plot of σ of porous SES in 1M LiPF6 in EC/DEC as a function of a) $\phi_v$ for select values of $\alpha$. In b) the conductivity of Celgard 2400 in the same electrolyte is shown for comparison, where σ is plotted as a function of σ for a $\phi_v$ of 0.43. In c) $\alpha$ is plotted as a function of σ for values of $\phi_v$ of 0.16, 0.29, and 0.35. In d) the average σ for all $\alpha$ values are plotted for $\phi_v$ values of 0.16, 0.29, and 0.35. σ is compared for different values of σ at $\phi_v$=0.43.

Scanning electron micrographs of nanoporous membranes at a fixed $\phi_v=0.43$, shown in FIG. 4, reveal a potential reason for our other observations. Again, at $\alpha=0.12$ and $\phi_v=0.43$, we see a. At $\alpha=2.02$, the homopolymer chain length is too large and it macrophase separates into micron-sized domains. When the homopolymer is extracted from this sample, it leaves behind micron sized pores as shown in FIG. 5d. Upon examining FIG. 5 one might anticipate that the pores in FIG. 5d are far more effective for transport than the small pores in FIG. 5a. The transport measurements shown in FIG. 5 indicate otherwise. The porous structures shown in both FIGS. 4a and 4d are equally ineffective for transport. Nanoscale pores that are effective for transport are only seen at $\alpha=0.33$ in FIGS. 4b and $\alpha=0.94$ in FIG. 4c. The result of this on transport is dramatic. At $\phi_v=0.43$, ionic conductivity of the sample with $\alpha=0.22$ is 6 times greater that of the sample with $\alpha=0.12$. These observations on the morphology were verified by the $a_s$(BET) measurements shown in FIG. 3b. The $a_s$(BET) followed a very similar trend to the conductivity in that the $a_s$(BET) peaked at the intermediate values of $\alpha=0.432$, and decreased at both higher and lower values of $\alpha$.

Figure 6:
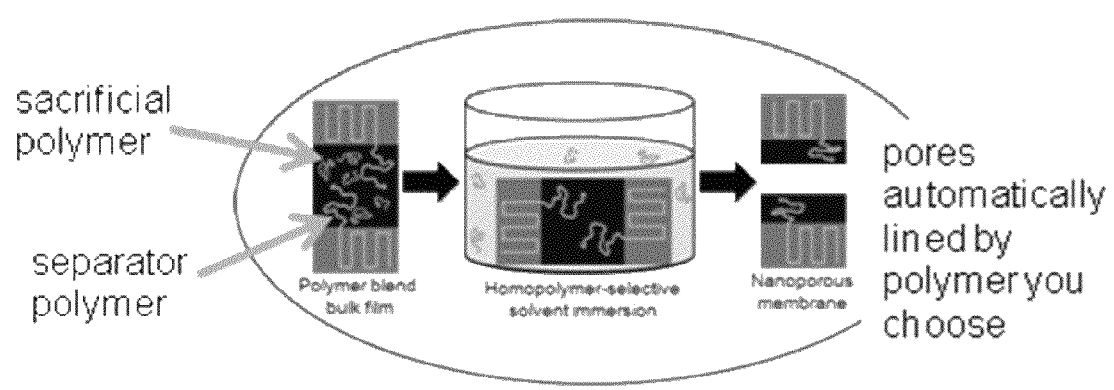
FIG. 6 is a schematic of the blending and extraction process used to make nanopoous battery separators.

By way of summary, the process of this invention is schematically illustrated in FIG. 6 wherein a sacrificial polymer is added to the separator medium, and the resulting blend cast into a film. Thereafter, the sacrificial polymer is dissolved away, such as by placing the film in an organic solvent bath. The thus produced film is then dried, and thereafter can be used to blending and extraction process used to make nanoporous battery separators according to one aspect of the invention.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

REFERENCES

1. Gaines, L.C., R., *Costs of Lithium-Ion Batteries for Vehicles*, D.o. Energy, Editor. 2000: Argonne, Illinois.
2. Zhang, S.S., *A review on the separators of liquid electrolyte Li-ion batteries*. Journal of Power Sources, 2007. 164 (1): p. 351-364.
3. Balsara, N.P., *Multicomponent polyolefin blends with ordered and disordered Microstructures*. Current Opinion in Solid State & Materials Science, 1998. 3(6): p. 589-595.
4. Datta, S. and D.J. Lohse, *Graft Copolymer Compatibilizers for Blends of Isotactic Polypropylene and Ethene Propene Copolymers .2. Functional Polymers Approach*. Macromolecules, 1993. 26(8): p. 2064-2076.
5. Jeon, H.S., J.H. Lee, and N.P. Balsara, *Predictions of the thermodynamic properties of multicomponent polyolefin blends from measurements on two-component systems*. Macromolecules, 1998. 31(10): p. 3328-3339.
6. Lefebvre, A.A., et al., Initial stages of nucleation in phase separating polymer blends. Journal of Chemical Physics, 1999. 111(13): p. 6082-6099.
7. Lohse, D.J., *The Melt Compatibility of Blends of Polypropylene and Ethylene-Propylene Copolymers*. Polymer Engineering and Science, 1986. 26(21): p. 1500-1509.

8. Ihm, D., J. Noh, and J. Kim, *Effect of polymer blending and drawing conditions on properties of polyethylene separator prepared for Li-ion secondary battery*. Journal of Power Sources, 2002. 109(2): p. 388-393.
9. Weighall, M.J., *Recent Advances in Polyethylene Separator Technology*. Journal of Power Sources, 1991. 34(3): p. 257-268.
10. Bates, F.S. and G.H. Fredrickson, *Block Copolymer Thermodynamics - Theory and Experiment*. Annual Review of Physical Chemistry, 1990. 41: p. 525-557.
11. Leibler, L., *Theory of Microphase Separation in Block Copolymers*. Macromolecules, 1980. 13(6): p. 1602-1617.
12. Matsen, M.W. and F.S. Bates, *Unifying weak- and strong-segregation block copolymer Theories*. Macromolecules, 1996. 29(4): p. 1091-1098.
13. Uehara, H., et al., *Size-Selective Diffusion in Nanoporous but Flexible Membranes for Glucose Sensors*. Acs Nano, 2009. 3(4): p. 924-932.
14. Yang, S.Y., et al., *Nanoporous membranes with ultrahigh selectivity and flux for the filtration of viruses*. Advanced Materials, 2006. 18(6): p. 709 -+.
15. Yang, S.Y., et al., *Single-File Diffusion of Protein Drugs through Cylindrical Nanochannels. Acs Nano*, 2010. 4(7): p. 3817-3822.
16. Lin, Y.C. and R.C.C. Tsiang, *Using heavy ethers as structure modifiers in the synthesis of SBS block copolymers in cyclohexane*. Journal of Applied Polymer Science, 1997. 64(13): p. 2543-2560.
17. Hahn, S.F., *An Improved Method for the Diimide Hydrogenation of Butadiene and Isoprene Containing Polymers*. Journal of Polymer Science Part a-Polymer Chemistry, 1992. 30(3): p. 397-408.
18. Mark, J.E., H.B. Eitouni, and N.P. Balsara, *Thermodynamics of Polymer Blends, in Physical Properties of Polymers Handbook*. 2007, Springer New York. p. 339-356.
19. Brunauer, S., P.H. Emmett, and E. Teller, *Adsorption of gases in multimolecular layers*. Journal of the American Chemical Society, 1938. 60: p. 309-319.
20. Sing, K.S.W., et al., *Reporting Physisorption Data for Gas Solid Systems with Special Reference to the Determination of Surface-Area and Porosity (Recommendations 1984)*. Pure and Applied Chemistry, 1985. 57(4): p. 603-619.
21. Gao, K., et al., *PE-g-MMA polymer electrolyte membrane for lithium polymer battery*. Electrochimica Acta, 2006. 52(2): p. 443-449.
22. Lee, J.Y., et al., *New separator prepared by electron beam irradiation for high voltage lithium secondary batteries*. Nuclear Instruments & Methods in Physics Research Section B-Beam Interactions with Materials and Atoms, 2009. 267(14): p. 2390-2394.
23. Leibler, L., *THEORY OF MICROPHASE SEPARATION IN BLOCK CO-POLYMERS*. Macromolecules, 1980. 13(6): p. 1602-1617.
24. Matsen, M.W. and F.S. Bates, *Block copolymer microstructures in the intermediate-segregation regime*. Journal of Chemical Physics, 1997. 106(6): p. 2436-2448.
25. Loo, Y.L., R.A. Register, and A.J. Ryan, *Polymer crystallization in 25-nm spheres*. Physical Review Letters, 2000. 84(18): p. 4120-4123.
26. Loo, Y.L., R.A. Register, and A.J. Ryan, *Modes of crystallization in block copolymer microdomains: Breakout, templated, and confined*. Macromolecules,2002. 35(6): p. 2365-2374.
27. Loo, Y.L., et al., *Polymer crystallization confined in one, two, or three dimensions*. Macromolecules, 2001. 34(26): p. 8968-8977.
28. Quiram, D.J., R.A. Register, and G.R. Marchand, *Crystallization of asymmetric diblock copolymers from microphase-separated melts*. Macromolecules, 1997. 30(16): p. 4551-4558.
29. Hamley, I.W., et al., *Crystallization thermodynamics and kinetics in semicrystalline diblock copolymers*. Polymer, 1998. 39(6-7): p. 1429-1437.
30. Hamley, I.W., et al., *Crystallization in oriented semicrystalline diblock copolymers*. Macromolecules, 1996. 29(27): p. 8835-8843.
31. Ryan, A.J., et al., *STRUCTURE DEVELOPMENT IN SEMICRYSTALLINE DIBLOCK COPOLYMERS CRYSTALLIZING FROM THE ORDERED MELT*. Macromolecules, 1995. 28(11): p. 3860-3868.
32. Schmalz, H., et al., *Synthesis and characterization of ABC triblock copolymers with two different crystalline end blocks: Influence of confinement on crystallization behavior and morphology*. Macromolecules, 2002. 35(27): p. 10004-10013.
33. Jeong, U.Y., et al., *Asymmetric block copolymers homopolymers: Routes to multiple length scale nanostructures*. Advanced Materials, 2002. 14(4): p. 274-+.
34. Matsushita, Y., et al., *LOCALIZATION OF A HOMOPOLYMER DISSOLVED IN A LAMELLAR STRUCTURE OF A BLOCK-COPOLYMER STUDIED BY SMALL-ANGLE NEUTRON-SCATTERING*. Macromolecules, 1993. 26(24): p. 6346-6349.
35. Winey, K.I., E.L. Thomas, and L.J. Fetters, *ORDERED MORPHOLOGIES IN BINARY BLENDS OF DIBLOCK COPOLYMER AND HOMOPOLYMER AND CHARACTERIZATION OF THEIR INTERMATERIAL DIVIDING SURFACES*. Journal of Chemical Physics, 1991. 95(12): p. 9367-9375.
36. Winey, K.I., E.L. Thomas, and L.J. Fetters, *SWELLING A LAMELLAR DIBLOCK COPOLYMER WITH HOMOPOLYMER- INFLUENCES OF HOMOPOLYMER CONCENTRATION AND MOLECULAR-WEIGHT*. Macromolecules, 1991. 24(23): p. 6182-6188.
37. Winey, K.I., E.L. Thomas, and L.J. Fetters, *ISOTHERMAL MORPHOLOGY DIAGRAMS FOR BINARY BLENDS OF DIBLOCK COPOLYMER AND HOMOPOLYMER*. Macromolecules, 1992. 25(10): p. 2645-2650.
38. Winey, K.I., E.L. Thomas, and L.J. Fetters, *THE ORDERED BICONTINUOUS DOUBLE -DIAMOND MORPHOLOGY IN DIBLOCK COPOLYMER HOMOPOLYMER BLENDS*. Macromolecules, 1992. 25(1): p. 422-428.
39. Matsen, M.W., *PHASE-BEHAVIOR OF BLOCK-COPOLYMER HOMOPOLYMER BLENDS*. Macromolecules, 1995. 28(17): p. 5765-5773.
40. Matsen, M.W., *New fast SCFT algorithm applied to binary diblock Copolymer/homopolymer blends*. Macromolecules, 2003. 36(25): p. 9647-9657.
41. Shull, K.R., *INTERFACIAL PHASE-TRANSITIONS IN BLOCK COPOLYMER HOMOPOLYMER BLENDS*. Macromolecules, 1993. 26(9): p. 2346-2360.
42. Shull, K.R. and K.I. Winey, *HOMOPOLYMER DISTRIBUTIONS IN LAMELLAR COPOLYMER HOMOPOLYMER BLENDS*. Macromolecules, 1992. 25(10): p. 2637-2644.
43. Janert, P.K. and M. Schick, *Phase behavior of binary homopolymer/diblock blends: Temperature and chain length dependence*. Macromolecules, 1998. 31(4): p. 1109-1113.
44. Kane, L., et al., *Molecular, nanostructural and mechanical characteristics of lamellar triblock copolymer blends:*

*Effects of molecular weight and constraint.* Macromolecular Rapid Communications, 2001. 22(5): p. 281-296.

45. Mykhaylyk, T.A., et al., *Ordered structures and phase transitions in thin films of Polystyrene/polyisoprene block copolymer and blends with the corresponding Homopolymers.* Journal of Materials Science, 2004. 39(6): p. 2249-2252.

46. Norman, D.A., et al., *Triblock copolymer/homopolymer blends: Conformational changes, microstructural transition and macrophase separation.* Journal of Materials Science Letters, 1998. 17(7): p. 545-549.

47. Roberge, R.L., et al., *Block copolymer/homopolymer mesoblends: Preparation and Characterization.* Macromolecules, 2002. 35(6): p. 2268-2276.

We claim:

1. A method for preparing a nanoporous polymer film comprising:
  a) mixing a poly(styrene-block-ethylene-block-styrene) with polystyrene homopolymer;
  b) casting a film from the mixture; and thereafter,
  c) submerging the film in an organic solvent to remove the polystyrene homopolymer to produce a nanoporous film wherein the pores are lined with polystyrene.

2. The method of claim 1 wherein the organic solvent is tetrahydrofuran.

3. The method of claim 1 further including the step of:
  (d) drying the film after removal from the solvent.

4. The method of claim 1 wherein the amount of polystyrene added is controlled to control pore size.

5. The method of claim 4 wherein additionally the relative size of the polystyrene added is controlled.

6. The method of claim 5 wherein the molecular weight of the polystrene homopolymers range from 1.8 kg/mol to 30 kg/mol.

7. A lithium ion battery, including a battery separator comprising a film formed according to the method of claim 3.

* * * * *